May 24, 1955    J. J. SCHEPPE    2,708,977
LAWN MOWER ELECTRIC DRIVING AND
STEERING CONTROL MECHANISM

Filed Aug. 2, 1950    3 Sheets-Sheet 1

John J. Scheppe
INVENTOR.

BY
*Attorneys*

May 24, 1955
J. J. SCHEPPE
2,708,977
LAWN MOWER ELECTRIC DRIVING AND
STEERING CONTROL MECHANISM
Filed Aug. 2, 1950
3 Sheets-Sheet 2
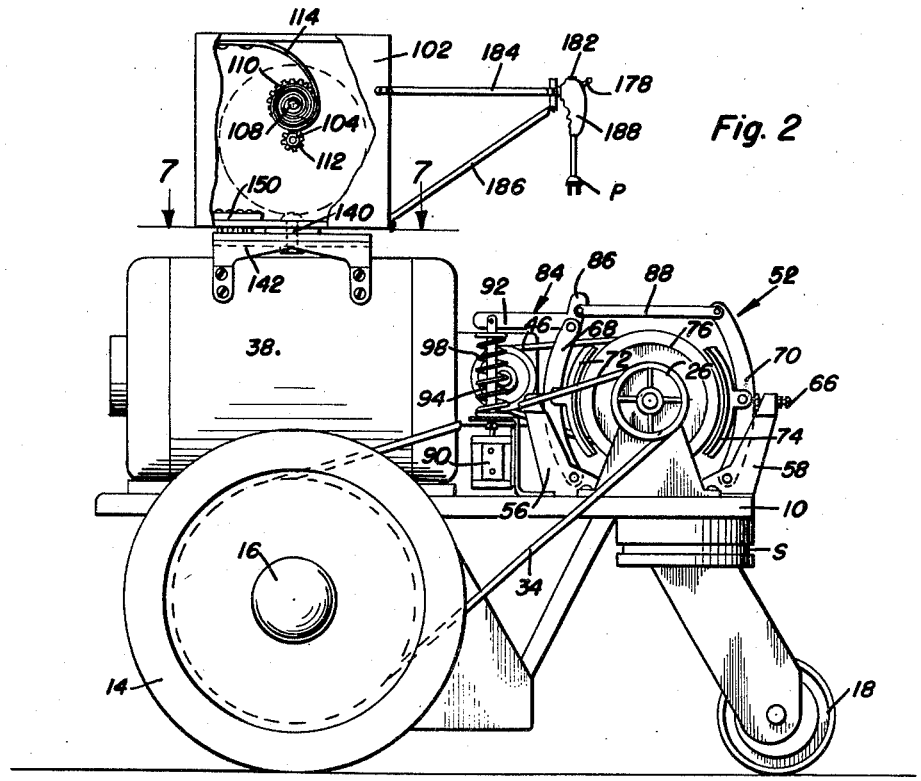
Fig. 2
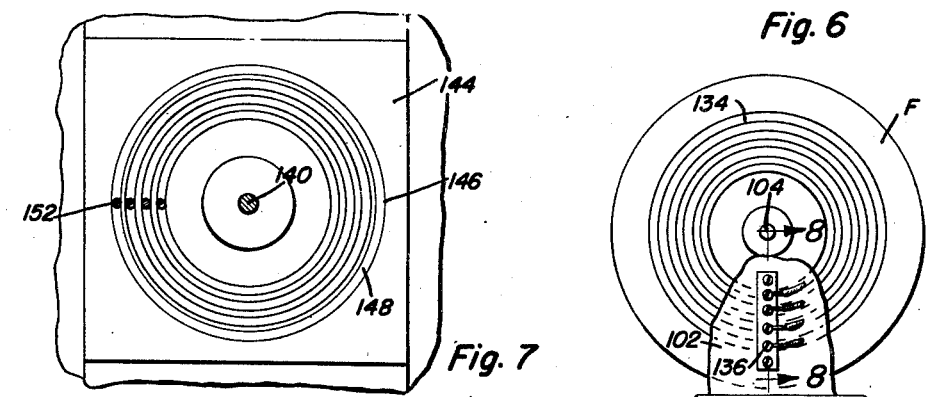
Fig. 6
Fig. 7
Fig. 8
John J. Scheppe
INVENTOR.

May 24, 1955

J. J. SCHEPPE 2,708,977

LAWN MOWER ELECTRIC DRIVING AND
STEERING CONTROL MECHANISM

Filed Aug. 2, 1950

John J. Scheppe
INVENTOR.

BY
Attorneys

United States Patent Office 2,708,977
Patented May 24, 1955

2,708,977

LAWN MOWER ELECTRIC DRIVING AND STEERING CONTROL MECHANISM

John J. Scheppe, Trenton, N. J.

Application August 2, 1950, Serial No. 177,274

2 Claims. (Cl. 180—2)

This invention relates to new and useful improvements in lawn mowers and the primary object of the present invention is to provide a lawn mower having a pair of supporting wheels and an electric motor for driving the wheels and thereby moving the lawn mower over a lawn so that an operator will merely be required to guide the mower.

Another important object of the present invention is to provide a lawn mower including a motor driven differential shaft whose two sections are connected to the two wheels of the mower and a brake unit for each section whereby a selected wheel may be stopped to permit swinging of the mower about the stopped wheel as a pivot.

Yet another object of the present invention is to provide a lawn mower including an electric motor and a spring tensioned reel for the outlet cord of the motor that will rewind the cord after the cord has been unwound from the reel.

Another object of the present invention is to provide a lawn mower of the aforementioned character involving a leveling mechanism that is operated by the reel for the even winding of the outlet cord upon the reel.

Another object of the present invention is to provide an electrically operated lawn mower having a differential shaft, a braking unit for each section of the shaft and a solenoid for actuating each braking unit so that the brake units may be independently activated by a switch remote from the braking unit.

A further object of the present invention is to provide a power driven lawn mower that is extremely compact for easy manipulation and which embodies a novel means for steering and permitting the lawn mower to be swung about to travel back and forth over a lawn.

A still further aim of the present invention is to provide a lawn mower that is simple and practical in construction, strong and reliable in use, efficient and durable in operation, inexpensive to manufacture and service, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 2 is a side elevational view of Figure 1 and with parts of the reel housing broken away;

Figure 6 is a detail view showing the manner in which the outlet cord on the reel is electrically connected to the motor;

Figure 7 is an enlarged sectional view taken substantially on the plane of section line 7—7 of Figure 2;

Figure 8 is an enlarged vertical sectional view taken substantially on the plane of section line 8—8 of Figure 6.

Figure 1:
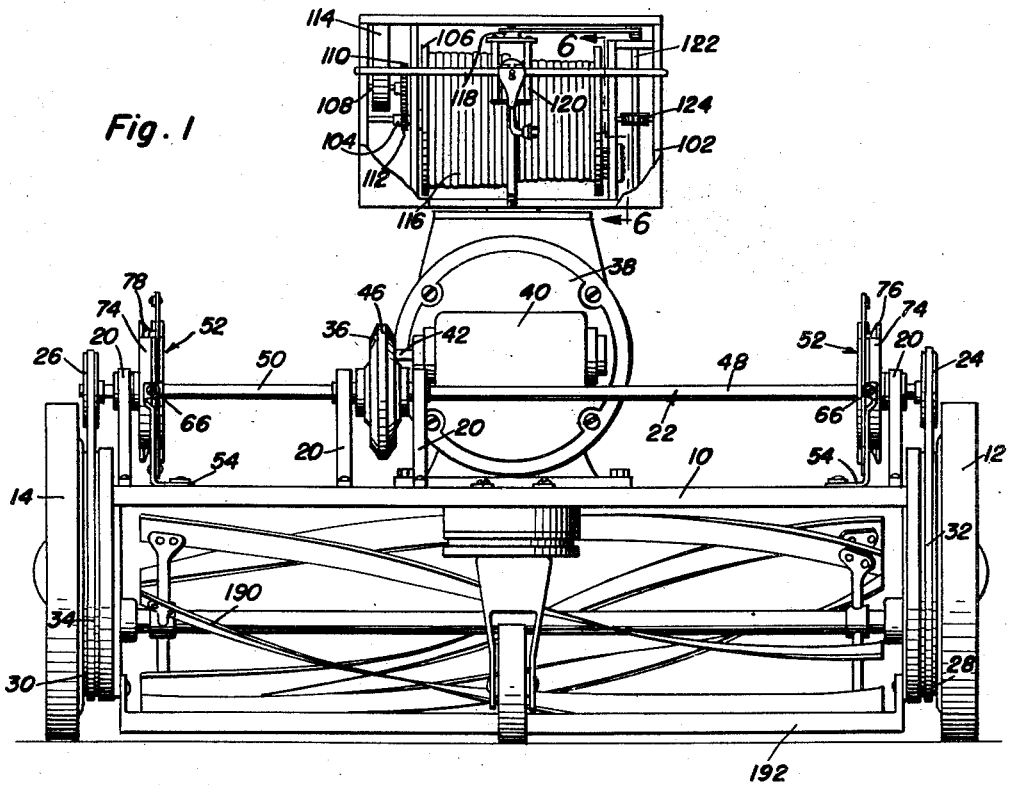
Figure 1 is a rear elevational view of the present invention.

Referring now to the drawings in detail, wherein for the purpose of illustration there is disclosed a preferred embodiment of the present invention, the numeral 10 represents a wheeled frame having a forward pair of drive wheels 12 and 14 that are mounted on coaxial stub axles or shafts 16, and a rear trailing and guiding wheel 18 that is swiveled to the frame, as at S.

Bearings 20 are mounted on the rear portion of the frame 10 and rotatably support a driven differential shaft 22 on the ends of which there are secured pulleys 24 and 26. The pulleys 24 and 26 are connected to further pulleys 28 and 30, that are suitably secured to the inner faces of the wheels 12 and 14 by endless pulley belts 32 and 34. The shaft 22 includes a differential pulley 36 so that the two sections of the shaft 22 can rotate as a unit or independently for a purpose later to be more fully described.

An electric motor 38 is mounted on the frame 10 and between the wheels 12 and 14. The drive shaft of the motor is connected to reduction gearing in a housing 40 having a shaft 42 that parallels the shaft 22 and which supports a pulley 44. The pulleys 36 and 44 are connected by an endless drive belt 46.

Figure 4:
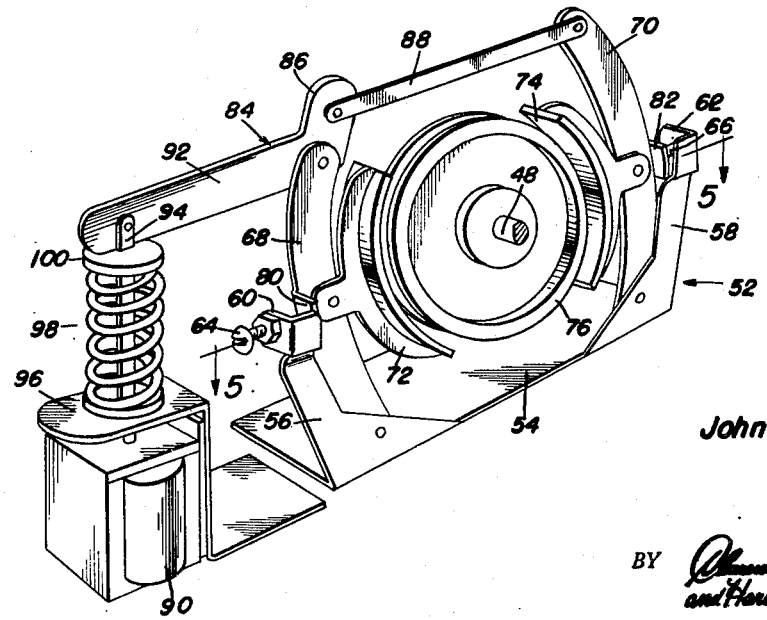
Figure 4 is a perspective view of one of the brake units used in the present invention and applied to one section of the differential shaft.
Figure 3:
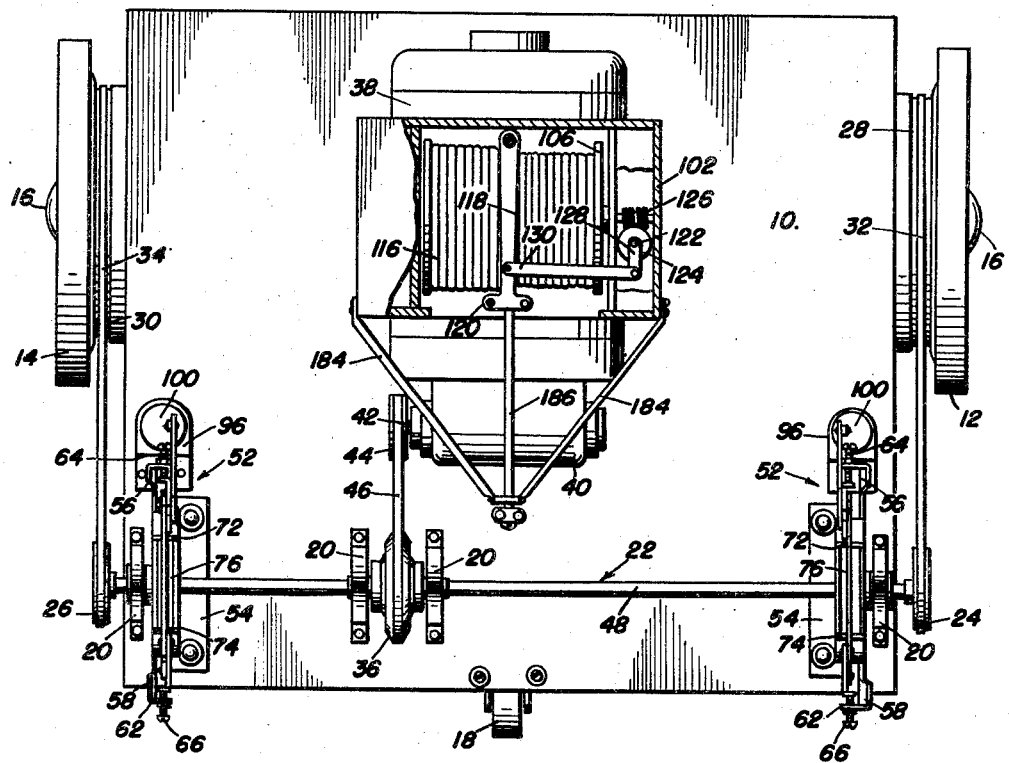
Figure 3 is a plan view of Figure 1 and with parts of the reel housing broken away.
Figure 5:
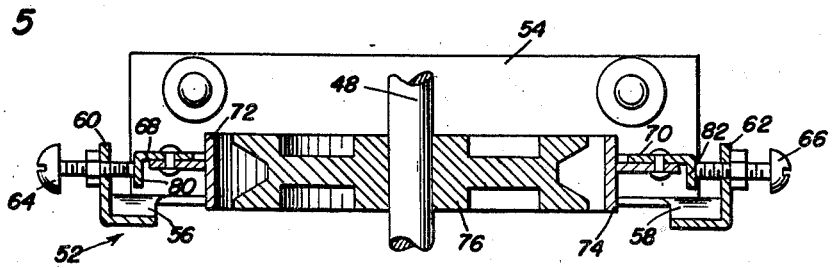
Figure 5 is a sectional view taken substantially on the plane of section line 5—5 of Figure 4.
Figure 9:
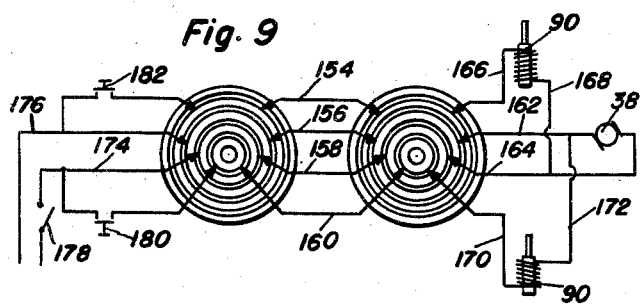
Figure 9 is a diagrammatic view showing the wiring system used in the present invention.

The shaft 22 is composed of two sections 48 and 50, each of which is associated with a braking unit 52, as shown best in Figure 4. The braking units 52 include base plates 54 that are mounted on the frame 10. Supports 56 and 58 rise from the base plates and ears 60 and 62 at the upper ends of the supports 56 and 58 threadingly receive pressure members or screws 64 and 66.

Brake members including vertically swingable links 68 and 70 are pivoted at their lower ends to the supports 56 and 58. The central portions of the links 68 and 70 are pivoted to brake shoes 72 and 74 whose linings oppose the circumferential edges of brake wheels or pulleys 76 and 78 mounted on the sections 48 and 50. Lateral extensions 80 and 82 on the links 68 and 70 oppose the pressure members 64 and 66 to permit adjustment of the brake shoes toward the brake wheels.

Bellcranks 84 are pivoted at their apices to the upper ends of the links 68 and the shorter legs 86 of the bellcranks are connected to the upper ends of the links 70 by pitmans 88 so that the brake shoes will be urged against the brake wheels as the shorter legs of the bellcranks are lowered.

Solenoids 90 are mounted on the frame 10 beneath the longer legs 92 of the bellcranks 84. The solenoids 90 include vertically movable rods 94 whose upper bifurcated ends are pivoted to the legs 92. The rods 94 are guided by brackets 96 and springs 98 surround the rods 94 and are biased between the brackets 96 and abutments 100 on the rods 94 to yieldingly urge the rods to a raised position and the brakeshoes 72 and 74 away from the brake wheels. When the circuits to the solenoids are closed, the rods 94 will move vertically downward to urge the brake shoes to their brake applying position.

A reel housing 102 is supported on the motor 38 and rotatably supports the horizontal supporting shaft 104 of a reel 106. Another shaft 108 is rotatably supported by one side wall of the housing 102 and holds a gear 110 that meshes with a gear 112 carried by one end of the reel shaft 104.

A tension spring 114 is anchored at one end to the shaft 108 and at its other end to the housing 102 so that as an electric cord 116 is unwound from the reel 106 and released, the reel will rotate to again wind the cord upon the reel.

Means is provided for assuring a level winding and unwinding of the cord 116 on or from the reel 106. This means consists of a horizontally swingable arm 118 that overlies the reel and whose rear end supports a guide 120 through which the cord 116 is trained. A vertically rotatable shaft 122 is mounted in the housing 102 and supports a gear 124 that meshes with a worm 126 on one end of the shaft 104. An arm 128, fixed to and projecting laterally from the upper end of the shaft 122 is connected to the arm 118 by a pitman or link 130 so that as the reel rotates, the arm 118 will swing horizontally with the guide 120 moving back and forth between the ends of the reel.

One flange F of the reel 106 is provided with four concentric grooves 132 in which conductive rings 134 are mounted. The cord 116 is composed of four wires W that are attached at one of their ends to the rings 134, as shown in Figure 8. An insulated block 136 is secured to one wall of the housing 102 and supports four spring-urged conductive fingers 138 that ride against the rings 134.

The reel housing 102 is mounted for horizontal swinging movement on a vertical pivot 140 carried by a mounting bracket 142 that is secured to the motor 38. The upper horizontal insulated wall 144 of the mounting bracket 142 is formed with four concentric grooves 146 about the pivot 140, in which conductive rings 148 are mounted. An insulated block 150 is secured to the bottom wall of the housing 102 and supports four spring-urged conductive fingers 152 that ride against the rings 148 and which are connected to the rings 134 by conductors 154, 156, 158 and 160.

The inner two fingers of the group of fingers 152 are connected to the motor 38 by conductors 162 and 164; one of the solenoids 90 is connected to the outermost of the fingers 152 by a conductor 166 and to the conductor 164 by a conductor 168; and the other solenoid 90 is connected to the innermost of the fingers 152 by a conductor 170 and to the conductor 162 by a conductor 172.

The inner two rings of the group of rings 134 are connected to a source of current by power wires 174 and 176 (two of the wires W) with a switch 178 interposed in one of the wires, namely, wire 174. The innermost of the rings 134 is connected to the wire 174 through a switch 180 and the outermost of the rings 134 is connected to the wire 176 by a switch 182.

A pair of rearwardly converging support arms 184 are mounted on the housing 102 and are braced to the housing by a brace arm 186. The arms 184, 186 support a hand grip 188 that is hollow to receive the switches 178, 180 and 182.

In practical use of the present invention, the plug P at the free end of the insulated outlet cord 116, and more particularly the wires 174 and 176, is placed in a house socket. Brakes are released and held in open position by spring 98, actuating switch or button 182 closes the circuit and current will enter solenoids 90 to actuate the brakes. The switches 180 and 182 are of the press type and springs normally urge these switches to their circuit open position, thereby requiring manual pressure to urge these switches to their circuit closed position.

By actuating a selected one of the switches 180, 182, one of the wheels 12 or 14 will be stopped, but the other wheel will still rotate to turn the mower about the stopped wheel.

The mower frame 10 supports the usual cutter assembly or reel 190 and a cutter blade 192, the former, 190, rotating in response to a movement of the wheels 12 and 14 in the usual manner.

Having described the invention, what is claimed as new is:

1. In a lawn mower including a pair of ground wheels and a platform, a pair of power shafts on said platform operatively connected to said wheels and operative differentially for steering of the lawn mower, a pair of brakes on said platform operative independently for applying braking pressure to said shafts to cause differential operation of said shafts, a pair of solenoids on said platform operatively connected to said brakes for operating said brakes selectively, an electric cord adapted for connection to a source of electric energy for said solenoids, a rotary reel for winding up and unwinding said cord, a housing rotatably supporting said reel, supporting means on said platform for said housing including a bracket having a vertical pivot pin about which said housing is horizontally swingable to correspondingly swing said reel, and means electrically connecting said cord to both said solenoids during rotation of said reel and swinging of said housing comprising a separate circuit between said cord and each solenoid, a separate control switch in each circuit for each solenoid, each solenoid being connected in its circuit to its switch and to the cord by a pair of relatively rotatable and fixed contacts carried by the reel and housing, respectively, and a second pair of relatively rotatable and fixed contacts carried by the housing and bracket, respectively.

2. The combination of claim 1, said brakes each comprising a pair of pivoted brake shoes, a bellcrank lever pivoted to one brake shoe and having long and short lever arms, a link operatively connecting the short lever arm to the other brake shoe, one of said solenoids being operatively connected to the long lever arm.

References Cited in the file of this patent

UNITED STATES PATENTS

| | | |
|---|---|---|
| 951,146 | Paris | Mar. 8, 1910 |
| 1,154,322 | Klein | Sept. 21, 1915 |
| 1,323,502 | Thomas et al. | Dec. 2, 1919 |
| 1,469,603 | Peters | Oct. 2, 1923 |
| 1,731,086 | Wise | Oct. 8, 1929 |
| 1,802,358 | Smith | Apr. 28, 1931 |
| 1,860,394 | Ohler | May 31, 1932 |
| 1,961,780 | Price | June 5, 1934 |
| 2,380,796 | Schnell | July 31, 1945 |
| 2,486,167 | Jurasevich | Oct. 25, 1949 |
| 2,521,262 | Smith | Sept. 5, 1950 |